(12) United States Patent
Marsch et al.

(10) Patent No.: US 10,817,868 B1
(45) Date of Patent: Oct. 27, 2020

(54) PAYMENT CARD WITH REMOVABLE CARTRIDGE

(71) Applicant: Capital One Services, LLC, McLean, VA (US)

(72) Inventors: Daniel John Marsch, Sterling, VA (US); Abdelkader M'Hamed Benkreira, New York, NY (US); Taurean Butler, Brooklyn, NY (US); Jessica Greenberg, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/802,719

(22) Filed: Feb. 27, 2020

(51) Int. Cl.
*G06K 5/00* (2006.01)
*G06Q 20/34* (2012.01)

(52) U.S. Cl.
CPC ......... *G06Q 20/341* (2013.01); *G06Q 20/347* (2013.01); *G06Q 20/352* (2013.01)

(58) Field of Classification Search
CPC ........ G07F 7/1008; G07F 7/08; G06Q 20/341
USPC ....................................... 235/380
See application file for complete search history.

(56) References Cited

U.S. PATENT DOCUMENTS

| | | | |
|---|---|---|---|
| 4,620,727 A | 11/1986 | Stockburger et al. | |
| 5,255,941 A | 10/1993 | Solomon | |
| 5,538,291 A | 7/1996 | Gustafson | |
| 5,818,030 A | 10/1998 | Reyes | |
| 6,554,193 B1 * | 4/2003 | Fehrman | G06K 19/077 235/487 |
| 2005/0242193 A1 | 11/2005 | Smith et al. | |
| 2014/0076975 A1 | 3/2014 | Bellmyer et al. | |
| 2015/0213354 A1 * | 7/2015 | Wang | G06K 19/07739 235/492 |
| 2015/0347893 A1 * | 12/2015 | Komatsu | G06K 19/07732 235/492 |
| 2019/0272457 A1 * | 9/2019 | Vu | G07F 7/0833 |

* cited by examiner

*Primary Examiner* — Ahshik Kim
(74) *Attorney, Agent, or Firm* — Banner & Witcoff, Ltd.

(57) ABSTRACT

Aspects described herein may allow for a payment card assembly including a payment card having a first slot formed in a first surface therein, with the first slot having a bottom surface and pair of opposed side walls. A first cartridge houses electronic components and is removably received in the first slot. One or more first projections are formed on one of the first slot and the first cartridge. One or more first recesses are formed in the other of the first slot and the cartridge, with each first recess receiving a corresponding first projection to releasably retain the first cartridge in the first slot.

19 Claims, 2 Drawing Sheets

PAYMENT CARD WITH REMOVABLE CARTRIDGE

FIELD OF USE

Aspects of the disclosure relate generally to a payment card with a removable cartridge. More specifically, aspects of the disclosure may provide for a payment card having a slot formed therein and a cartridge housing electronic components and being removably received in the slot.

BACKGROUND

Payment cards are becoming increasingly more expensive as card issuers are making payment cards of expensive materials, such as metal, and including electronic components within the payment cards thereby creating so-called smart cards. Instances of fraud drive have historically forced users to replace their payment cards, which is becoming more expensive as the cost of the payment cards grows.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a system that allows a user to remove a cartridge from a payment card, such as a credit card, that includes electronic components, such as a magnetic strip or a Europay Mastercard Visa ("EMV") chip. Having a removable cartridge allows the user to replace an electronic component, such as a magnetic strip or EMV chip without replacing the entire card. Certain embodiments include first and second slots for respective first and second cartridges, each housing electronic components.

In accordance with certain embodiments, a payment card assembly includes a payment card having a first slot formed in a first surface therein, with the first slot having a bottom surface and pair of opposed side walls. A first cartridge houses electronic components and is removably received in the first slot. One or more first projections are formed on one of the first slot and the first cartridge. One or more first recesses are formed in the other of the first slot and the cartridge, with each first recess receiving a corresponding first projection to releasably retain the first cartridge in the first slot.

In accordance with other aspects, a payment card assembly includes a payment card having a first slot formed in a first surface of the payment card, with the first slot having a bottom surface and pair of opposed side walls. A second slot is formed in a second surface of the payment card, with the second slot having a bottom surface and pair of opposed side walls. A first cartridge houses electronic components and is removably received in the first slot. A second cartridge houses electronic components and is removably received in the second slot. One or more first projections are formed on one of the first slot and the first cartridge, and one or more first recesses formed in the other of the first slot and the first cartridge. Each first recess receives a corresponding first projection to releasably retain the first cartridge in the first slot. One or more second projections are formed on one of the second slot and the second cartridge and one or more second recesses are formed in the other of the second slot and the second cartridge. Each second recess receives a corresponding second projection to releasably retain the second cartridge in the second slot.

In accordance with further aspects, a payment card assembly includes a payment card having a first slot formed in a first surface of the payment card, with the first slot having a bottom surface, a pair of opposed side walls, and a first end wall at one end of the first slot. A second slot is formed in a second surface of the payment card, with the second slot having a bottom surface, a pair of opposed side walls, and a card electrical contact. A first cartridge includes a magnetic strip and is removably received in the first slot. A second cartridge includes an EMV chip and a chip electrical contact, and is removably received in the second slot, with the chip electrical contact making contact with the card electrical contact when the second cartridge is received in the second slot. One or more first projections are formed on one of the first slot and the first cartridge. One or more first recesses are formed in the other of the first slot and the first cartridge, with each first recess receiving a corresponding first projection to releasably retain the first cartridge in the first slot. One or more second projections are formed on one of the second slot and the second cartridge, and one or more second recesses are formed in the other of the second slot and the second cartridge. Each second recess receives a corresponding second projection to releasably retain the second cartridge in the second slot. An antenna is positioned in the payment card between the bottom surface of the first slot and the bottom surface of the second slot.

By using removable cartridges that are received in slots in a payment card, individuals can more readily replace a magnetic strip or EMV chip without the need to replace the entire payment card. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
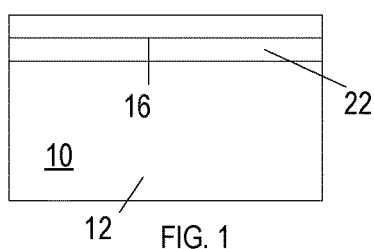
FIG. 1 depicts a plan view of an example of a payment card with a first cartridge received therein that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Embodiments discussed herein depict a payment card having one or more slots that receive removable cartridges. Exemplary payment cards can include credit cards, debit cards, ATM cards, and money access cards ("MAC"). A removable cartridge for a payment card may include a magnetic strip and/or an EMV chip. The removable cartridge may be removed from a user's payment card and replaced with a new removable cartridge, thereby allowing a user to provide a new magnetic strip and/or EMV for their card, without replacing the entire payment card. This is especially advantageous where the payment card is made of an expensive material, such as metal, and/or where the payment cards include electronics positioned within the card, such as an antenna, for example.

An embodiment of a payment card 10 is illustrated in FIGS. 1-4. Payment card 10 may include a first surface 12 and an opposed second surface 14, with a first slot 16 formed in first surface 12. First slot 16 may include a pair of opposed side walls 18, and a bottom surface 20. In certain embodiments, first slot 16 may extend along substantially an entire length of payment card 10.

Figure 2:
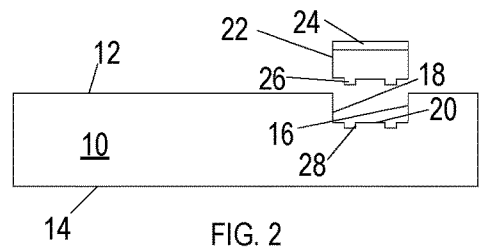
FIG. 2 depicts an elevation view of the payment card of FIG. 1.
Figure 3:
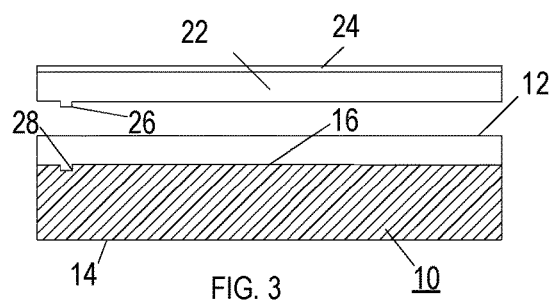
FIG. 3 depicts a section view of the payment card of FIG. 1, shown with a first cartridge prior to being received in a first slot in the payment card.

A first cartridge 22 may be removably received in first slot 16, and may house electronic components. For example, as illustrated in FIGS. 2-3, first cartridge 22 may include a magnetic strip 24 on its upper surface. In other embodiments, first cartridge 22 may include an EMV chip. An exemplary EMV chip is illustrated below in FIGS. 11-12 in an embodiment including a second slot and a second cartridge.

In certain embodiments one or more first projections 26 may be formed in one of first slot 16 and first cartridge 22, with one or more mating first recesses 28 formed in the other of first slot 16 and first cartridge 22. The engagement of each first projection 26 with a mating corresponding first recess 28 allows first cartridge 22 to be releasably engaged with payment card 10 such that first cartridge 22 is releasably retained within first slot 16. It is to be appreciated that first projections 26 may engage in snap-fit fashion with first recesses 28 to help retain first cartridge 22 within first slot 16.

Figure 4:
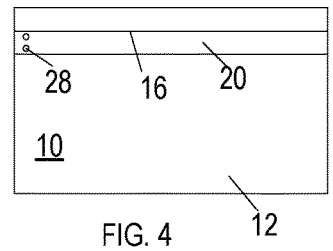
FIG. 4 depicts a plan view of the payment card of FIG. 1, shown without the first cartridge.

In the illustrated embodiment, a pair of first projections 26 is formed on the bottom surface of first cartridge 22, and a mating pair of first recesses 28 is formed in bottom surface 20 of first slot 16 proximate one end of payment card 10 (seen as the left end in FIGS. 3 and 4). As noted above, it is to be appreciated that in other embodiments first projections 26 could be formed on bottom surface 20 of first slot 16, with the mating first recesses 28 formed in the bottom surface of first cartridge 22.

Figure 5:
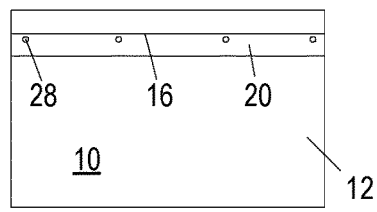
FIG. 5 depicts a plan view of an alternative embodiment of the payment card of FIG. 1.

It is to be appreciated that the number of first projections 26 and mating first recesses 28 may vary, and that the location of first projections 26 and mating first recesses 28 may vary as well. For example, as illustrated in FIG. 5, a row of four first recesses 28 is formed in bottom surface 20 of first slot 16, which will naturally releasably engage with a corresponding mating set of four first projections 26 formed on a bottom surface of first cartridge 22 (not shown).

Figure 6:
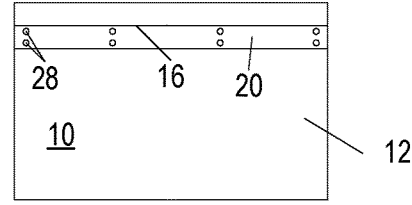
FIG. 6 depicts a plan view of another alternative embodiment of the payment card of FIG. 1.

In another embodiment, as illustrated in FIG. 6, four pairs of first recesses 28 are formed in bottom surface 20 of first slot 16, which will naturally releasably engage with a corresponding mating set of four pairs of first projections 26 formed on a bottom surface of first cartridge 22 (not shown).

Figure 7:
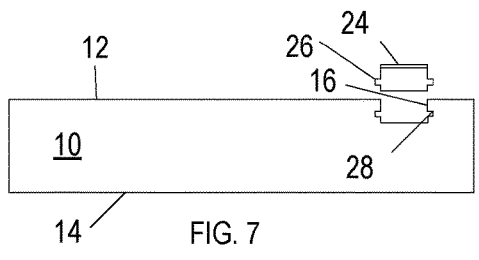
FIG. 7 depicts an elevation view of a further alternative embodiment of the payment card of FIG. 1.

In other embodiments, first recesses 28 may be formed on side walls 18 of first slot 16 rather than on bottom surface 20, with the corresponding mating first projections 26 being formed on opposed sides of first cartridge 22, as illustrated in FIG. 7.

Figure 8:
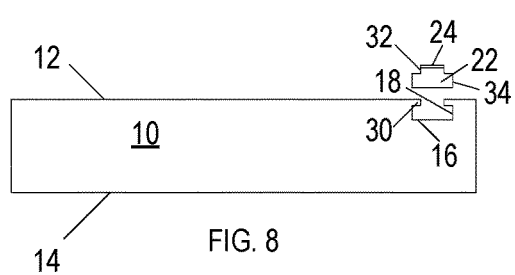
FIG. 8 depicts an elevation view of yet another alternative embodiment of the payment card of FIG. 1.

In other embodiments, as illustrated in FIG. 8, a pair of shoulders 30 may be formed in first slot 16, with each shoulder 30 extending inwardly from a top of one of side walls 18 and extending longitudinally along first slot 16. A mating pair of notches 32 may be formed on first cartridge 22, with each notch 32 extending along a longitudinally extending upper edge of a side wall 34 of first cartridge 22. When first cartridge 22 is received in first slot 16, each notch 32 receives a corresponding shoulder 30 of first slot 16, thereby helping retain first cartridge 22 in first slot 16.

Figure 9:
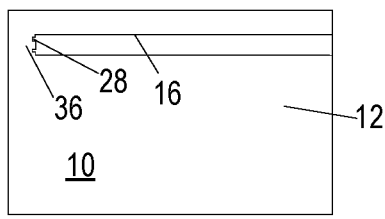
FIG. 9 depicts a plan view of another alternative embodiment of the payment card of FIG. 1.

In other embodiments, as illustrated in FIG. 9, an end wall 36 may be formed at one end of first slot 16. End wall 36 may serve as an abutment against which first cartridge 22 is positioned when it is received in first slot 16. In such an embodiment, recesses 28 may be formed on end wall 36 and receive corresponding projections 26 formed on an end of first cartridge 22 (not shown here). It is to be appreciated that in such an embodiment first slot 16 does not extend along substantially an entire length of payment card 10 due to end wall 36 being positioned at the end of first slot 16.

Figure 10:
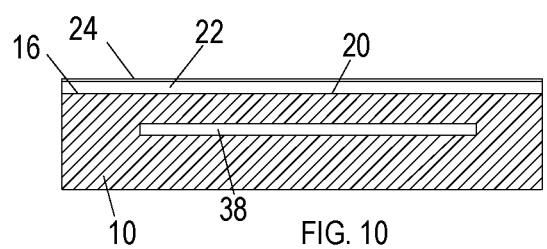
FIG. 10 depicts a section view of an alternative embodiment of the payment card of FIG. 1 shown with an antenna embedded in the payment card.

In a further embodiment, as illustrated in FIG. 10, an antenna 38 may be positioned within payment card 10, beneath bottom surface 20 of first slot 16. It is to be appreciated that in other embodiments other, or additional, electronic components may be embedded within payment card 10 beneath bottom surface 20 of first slot 16.

Figure 11:
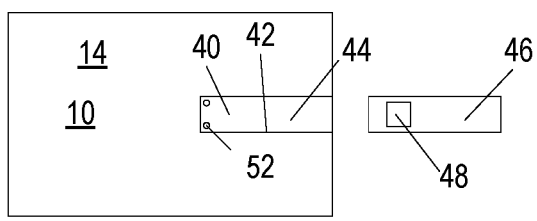
FIG. 11 depicts a plan view of an opposite side of the payment card of FIG. 1, shown with a second cartridge prior to being received in a second slot in the payment card.
Figure 12:
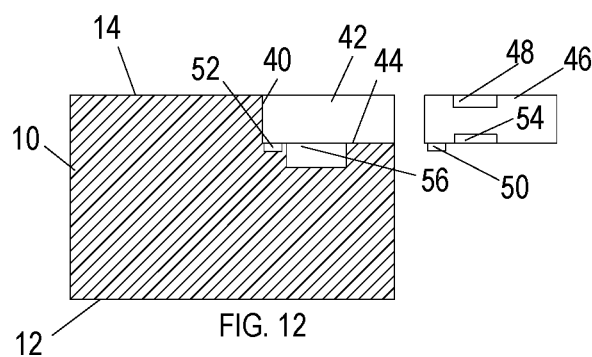
FIG. 12 depicts a section view of the payment card of FIG. 11, shown with the second cartridge prior to being received in the second slot in the payment card.

As noted above, first cartridge 22 may include an EMV chip rather than a magnetic strip. In other embodiments, payment card 10 may include both a magnetic strip 24 on first cartridge 22 and an EMV chip on a second cartridge received in payment card 10. As illustrated in FIGS. 11-12, a second slot 40 may be formed in second surface 14 of payment card 10. Second slot 40 may include a pair of opposed side walls 42, and a bottom surface 44. In certain embodiments, second slot 16 may extend along only a portion of a length of payment card 10. In the embodiment illustrated in FIG. 11, second slot 40 extends to a central portion of payment card 10.

A second cartridge 46 may be removably received in second slot 40, and may house electronic components. For example, second cartridge 46 may house an EMV chip 48 on its upper surface.

It is to be appreciated that in certain embodiments first slot 16 with first cartridge 22 and second slot 40 with second cartridge 46 may both be positioned on the same side of payment card 10.

In certain embodiments one or more second projections 50 may be formed in one of second slot 40 and second cartridge 46, with one or more mating second recesses 52 formed in the other of second slot 40 and second cartridge 46. The engagement of each second projection 50 with a mating corresponding second recess 52 allows second cartridge 46 to be releasably engaged with payment card 10 such that second cartridge 46 is releasably retained within second slot 40 in a manner similar to that described above with respect of first cartridge 22 and first slot 16.

In the illustrated embodiment, a pair of second projections 50 is formed on the bottom surface of second cartridge 46, and a mating pair of second recesses 52 is formed in bottom surface 44 of second slot 40 proximate an interior end of second slot 40. As noted above, it is to be appreciated that in other embodiments second projections 50 could be formed on bottom surface 44 of second slot 40, with the mating second recesses 52 formed in the bottom surface of second cartridge 46.

It is to be appreciated that the number of second projections 50 and mating second recesses 52 may vary, and that the location of second projections 50 and mating second recesses 52 may vary as well, as described above with respect to first cartridge 22 and first slot 16.

Further, it is to be appreciated that second slot 40 may include second shoulders and second cartridge 46 may include corresponding mating second notches (not shown) that receive the second shoulders in a manner similar to that described above with respect to shoulders 30 and notches 32 of first slot 16 and first cartridge 22, respectively.

In certain embodiments, as illustrated in FIG. 12, second cartridge 46 may include a chip electrical contact 54 that is in electrical contact with EMV chip 48. A card electrical contact 56 may be provided on bottom surface 44 of second slot 40. When second cartridge 46 is received in second slot 40, chip electrical contact 54 may contact and electrically engage card electrical contact 56 so that the components on second cartridge 46, such as EMV chip, can be in electrical contact with any components housed within payment card 10, such as an antenna 38 (not shown) or any other electronic components.

By providing first slot 16 and second slot 40 in payment card 10 with mating projections and recesses on payment card 10 within first slot 16 and second slot 40, a user can easily replace a first cartridge 22 and/or a second cartridge 46, thereby easily replacing a magnetic strip 24 or EMV chip 48 without needing to replace the entire payment card 10.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A payment card assembly comprising:
    a payment card having a first slot formed in a first surface therein, the first slot having a bottom surface and pair of opposed side walls;
    a first cartridge housing electronic components and being removably received in the first slot;
    a plurality of first projections formed along a length of one of the first slot and the first cartridge; and
    a plurality of first recesses formed along a length of the other of the first slot and the first cartridge, each first recess receiving a corresponding first projection to releasably retain the first cartridge in the first slot.

2. The payment card assembly of claim 1, wherein each first projection is formed on the bottom surface of the first slot, and each first recess is formed on a bottom surface of the first cartridge.

3. The payment card assembly of claim 1, wherein each first projection is formed on one of the side walls of the first slot, and each first recess is formed on a side of the first cartridge.

4. The payment card assembly of claim 1, further comprising:
    a pair of first shoulders on the payment card, each first shoulder extending inwardly from a top of one of the side walls of the first slot and extending longitudinally along the first slot; and
    a pair of first notches on the first cartridge, each first notch extending along a longitudinally extending upper edge of one of the side walls of the first cartridge and receiving one of the first shoulders when the first cartridge is received in the first slot.

5. The payment card assembly of claim 1, further comprising an end wall formed at one end of the first slot.

6. The payment card assembly of claim 1, further comprising an antenna positioned in the payment card beneath the bottom surface of the first slot.

7. The payment card assembly of claim 1, wherein the first cartridge includes a magnetic strip.

8. The payment card assembly of claim 1, wherein the first slot extends along substantially an entire length of the payment card.

9. The payment card assembly of claim 1, wherein the first cartridge includes an EMV chip, and a chip electrical contact, and the bottom surface of the first slot includes a card electrical contact, the chip electrical contact making contact with the card electrical contact when the first cartridge is received in the first slot.

10. A payment card assembly comprising:
    a payment card including:
    a first slot formed in a first surface of the payment card, the first slot having a bottom surface and pair of opposed side walls; and
    a second slot formed in a second surface of the payment card, the second slot having a bottom surface and pair of opposed side walls;
    a first cartridge housing electronic components and being removably received in the first slot;
    a second cartridge housing electronic components and being removably received in the second slot;
    one or more first projections formed on one of the first slot and the first cartridge;
    one or more first recesses formed in the other of the first slot and the first cartridge, each first recess receiving a corresponding first projection to releasably retain the first cartridge in the first slot;
    one or more second projections formed on one of the second slot and the second cartridge; and
    one or more second recesses formed in the other of the second slot and the second cartridge, each second recess receiving a corresponding second projection to releasably retain the second cartridge in the second slot.

11. The payment card assembly of claim 10, wherein each first projection is formed on the bottom surface of the first slot, each second projection is formed on the bottom surface of the second slot, each first recess is formed on a bottom surface of the first cartridge, and each second recess is formed on a bottom surface of the second cartridge.

12. The payment card assembly of claim 10, wherein each first projection is formed on one of the side walls of the first slot, each second projection is formed on one of the side walls of the second slot, each first recess is formed on a side of the first cartridge, and each second recess is formed on a side of the second cartridge.

13. The payment card assembly of claim 10, further comprising:
a pair of first shoulders on the payment card, each first shoulder extending inwardly from a top of one of the side walls of the first slot and extending longitudinally along the first slot;
a pair of second shoulders on the payment card, each second shoulder extending inwardly from a top of one of the side walls of the second slot and extending longitudinally along the second slot;
a pair of first notches on the first cartridge, each first notch extending along a longitudinally extending upper edge of one of the side walls of the first slot of the first cartridge and receiving one of the first shoulders when the first cartridge is received in the first slot; and
a pair of second notches on the first cartridge, each second notch extending along a longitudinally extending upper edge of one of the side walls of the second slot of the second cartridge and receiving one of the second shoulders when the second cartridge is received in the second slot.

14. The payment card assembly of claim 10, further comprising an end wall formed at one end of the first slot.

15. The payment card assembly of claim 10, further comprising an antenna positioned in the payment card between the bottom surface of the first slot and the bottom surface of the second slot.

16. The payment card assembly of claim 10, wherein the first cartridge includes a magnetic strip.

17. The payment card assembly of claim 10, wherein the first slot includes a plurality of first projections positioned along a length of the one of the first slot and the first cartridge, the second slot includes a plurality of second projections positioned along a length of the one of the second slot and the second cartridge, a plurality of first recesses extending along a length of the other of the first slot and the first cartridge, and a plurality of second recesses extending along a length of the other of the second slot and the second cartridge.

18. The payment card assembly of claim 10, wherein the second cartridge includes an EMV chip, and a chip electrical contact, and the bottom surface of the second slot includes a card electrical contact, the chip electrical contact making contact with the card electrical contact when the second cartridge is received in the second slot.

19. A payment card assembly comprising:
a payment card including:
a first slot formed in a first surface of the payment card, the first slot having a bottom surface, a pair of opposed side walls, and a first end wall at one end of the first slot; and
a second slot formed in a second surface of the payment card, the second slot having a bottom surface, a pair of opposed side walls, and a card electrical contact;
a first cartridge including a magnetic strip and being removably received in the first slot;
a second cartridge including an EMV chip and a chip electrical contact and being removably received in the second slot, the chip electrical contact making contact with the card electrical contact when the second cartridge is received in the second slot;
one or more first projections formed on one of the first slot and the first cartridge;
one or more first recesses formed in the other of the first slot and the first cartridge, each first recess receiving a corresponding first projection to releasably retain the first cartridge in the first slot;
one or more second projections formed on one of the second slot and the second cartridge;
one or more second recesses formed in the other of the second slot and the second cartridge, each second recess receiving a corresponding second projection to releasably retain the second cartridge in the second slot; and
an antenna positioned in the payment card between the bottom surface of the first slot and the bottom surface of the second slot.

* * * * *